UNITED STATES PATENT OFFICE.

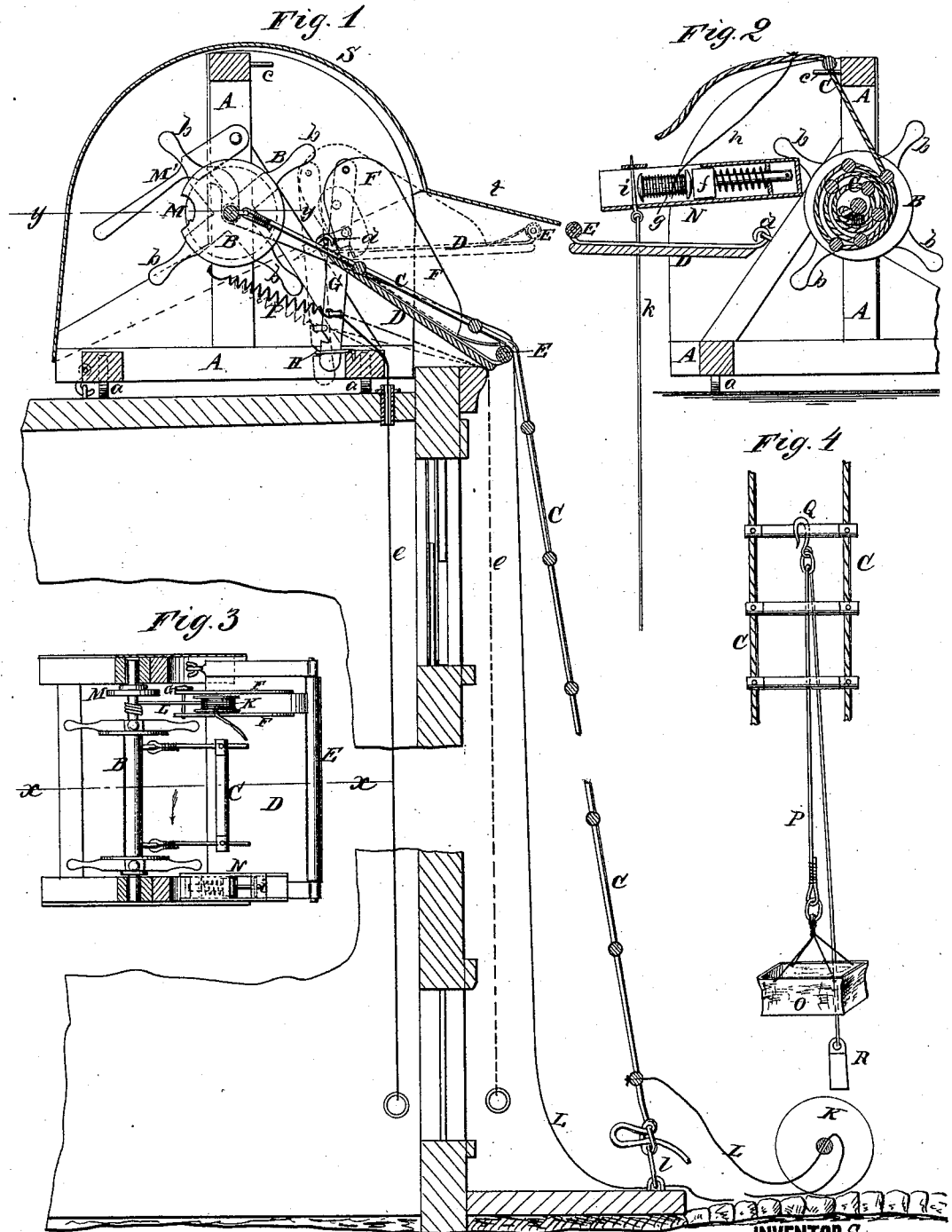

HENRY K. WARNER AND ZIMRI WARNER, OF LAKE CITY, MINNESOTA.

IMPROVEMENT IN FIRE-ESCAPES.

Specification forming part of Letters Patent No. 196,172, dated October 16, 1877; application filed June 18, 1877.

*To all whom it may concern:*

Be it known that we, HENRY K. WARNER and ZIMRI WARNER, of Lake City, in the county of Wabasha and State of Minnesota, have invented a new and Improved Fire-Escape, of which the following is a specification:

Figure 1 is a side elevation, in section, of our improved fire-escape. Fig. 2 is a section taken on line $x\ x$ in Fig. 3, looking in the direction of the arrow. Fig. 3 is a horizontal section on line $y\ y$ in Fig. 1. Fig. 4 represents an attachment to be used in connection with the ladder of the fire-escape.

Similar letters of reference indicate corresponding parts.

The object of our invention is to provide an improvement in the class of fire-escapes which may be placed on the tops or roofs of buildings and operated from below; and the invention consists in the construction and combination of parts, as hereinafter described and claimed.

In the drawing, A is a frame, provided with wheels $a$, upon which it may be easily moved from place to place, and B is a reel journaled in the said frame, and provided with arms or handles $b$, by which it may be turned.

A rope ladder, C, is attached to the reel B, and when not in use the lower round rests upon two pins, $c$, that project from the upper cross-piece of the frame A.

A platform, D, is hinged to the frame A at $d$, and is provided with a roller, E, which extends across its front edge, and with a trough or chute, F, for containing the spool K.

A catch, G, is pivoted to the chute F, and extends downward through a staple, H, with which it is made to engage by the spring I. This catch holds the platform D in a horizontal position, and the cord $e$ is attached to it. This cord may pass down inside of the building, as shown by the solid line in the drawing, or it may pass down outside of the wall, as indicated by the dotted line.

The chute F is provided with a curved bottom, which prevents the spool K from rolling out when the platform D is in a horizontal position, and guides the spool over the roller E when the platform is in an inclined position.

One end of the cord L, that is attached to the spool K, is fastened to the lower round of the ladder C, and the other end is attached to the shaft of the reel B.

M is a friction-wheel placed on the shaft of the reel, and M' is a brake-lever for controlling the action of the reel.

N is a tube containing a spring-follower, $f$, and a spool, $g$, upon which is wound a cord, $h$, the end of which is attached to the end of the ladder C. The spool $g$ is retained by a pin, $i$, that passes through holes in the tube N, and is provided with a cord, $k$, by which it may be withdrawn.

The ropes forming the sides of the ladder extend beyond the lower round, so that they may be tied into rings $l$, fixed to the walk or to some other solid object.

In Fig. 4 a device is shown which consists of a basket, O, attached to a rope, P, and a hook, Q, having a ring through which the rope passes, and a weight, R, which may be attached to the end of the rope.

A cover, S, is placed over the reel, and is provided with a projecting piece, $t$, which extends over the platform D.

The operation is as follows: In case of fire the cord $e$ is pulled, releasing the catch G and permitting the platform D to drop. The spool K now rolls down the chute and drops to the ground. By pulling the cord L the ladder C is drawn from the pins $c$, and is pulled over the roller E toward the ground. The unwinding of the ladder from the reel B winds one end of the cord L around the shaft of the reel, and should the ladder unwind too fast, it may be checked by pulling downward on the portion of the cord that is attached to the shaft of the reel. The unwinding of the reel may also be checked by means of the lever M'. When the end of the ladder touches the ground the ropes forming its sides are secured to the rings $l$. Should the cord L become detached or useless the cord $k$ is drawn so as to remove the pin $i$ from the tube N, when the spring-follower $f$ will throw the spool $g$ out and it will fall to the ground, and may be used to draw the ladder downward.

The rounds of the ladder are provided with metallic ferrules or caps, through which the rope C passes, and the rope and the ferrule are fastened by a rivet.

One of the chief uses of the ladder is to furnish a convenient and easily-adjusted means of access to the tops of buildings for the use of firemen.

In cases where invalids or timid persons desire to escape, the basket O is employed, the hook Q is carried upward and placed on one of the rounds of the ladder, the rope P is put through it, and the weight R is attached and let fall. The rope P is operated by persons below.

Having thus described our invention, we claim as new and desire to secure by Letters Patent—

The reel B, ladder C, platform D, catch G, cord E, chute F, spool K, and cord L, in combination, substantially as shown and described.

HENRY K. WARNER.
    ZIMRI WARNER.

Witnesses:
 J. ED. DOUGHTY,
 E. M. CARD.